June 18, 1957 E. T. A. PHILLIPS ET AL 2,796,530
STABILIZING ARRANGEMENTS FOR FACSIMILE APPARATUS AND THE LIKE
Filed Oct. 10, 1952
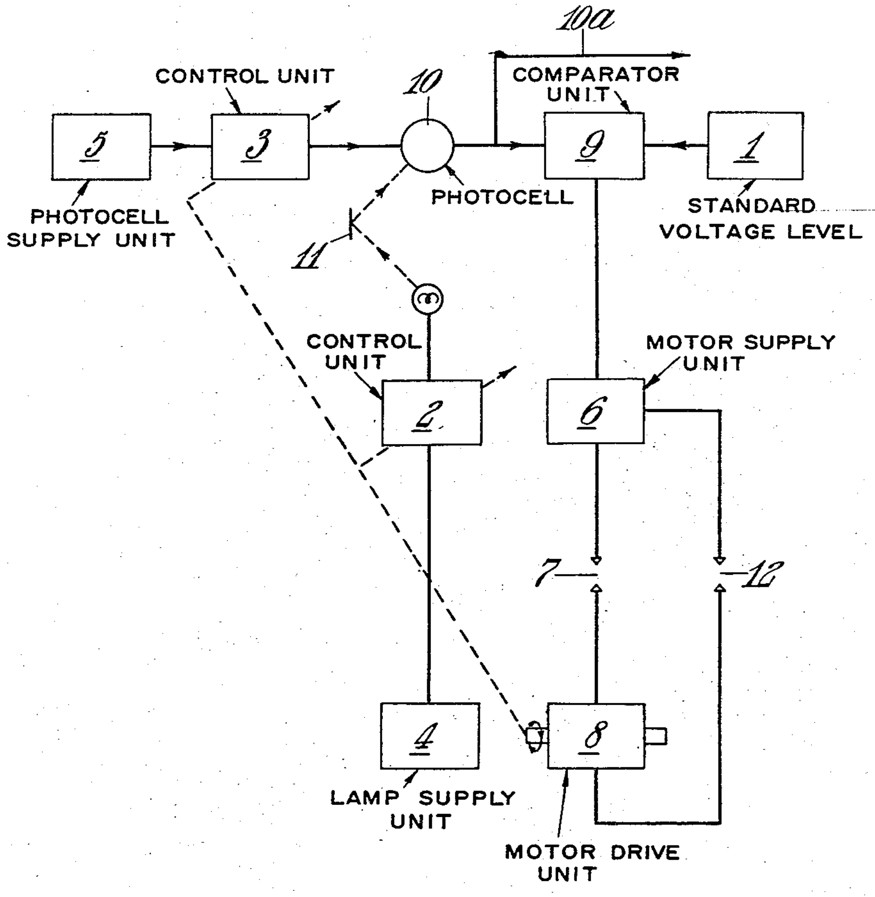
Inventors
E. T. A. Phillips
P. W. Sieber
By Glascock Downing & Seebold
Attys.

2,796,530
Patented June 18, 1957

2,796,530

STABILIZING ARRANGEMENTS FOR FACSIMILE APPARATUS AND THE LIKE

Eric Thomas Arthur Phillips and Peter William Sieber, Beckenham, England, assignors to Muirhead & Co. Limited, Beckenham, England Application October 10, 1952, Serial No. 314,116

Claims priority, application Great Britain October 26, 1951

3 Claims. (Cl. 250—205)

This invention relates to an arrangement for stabilising the output of a photocell for facsimile and the like purposes.

For purposes of facsimile transmission and allied systems employing optical scanning, it is often desirable to ensure that the output of the photocell fitted in the transmitter is equal to a predetermined value for the initial setting up of the scanning of each subject, thus taking care of variations in the sensitivity of the cell and the electric circuit due to long term or slow changes in the operating voltage, or due to fatigue in the photocell, aging of the lamp, whiteness of the general background of the copy or other reasons.

When manual setting of the optical and electrical levels is not permissible and where equipment is required to give satisfactory service over long periods, during which the variations mentioned above may be experienced, it is desirable that the setting up process be arranged to be automatic.

The system to be described has been developed to provide such an automatic control and hence immunity from the effects of the variations mentioned above to a degree whereby satisfactory facsimile transmission may be made during the period involved in a given transmission.

The invention consists of a sensitivity control arrangement for a facsimile scanner or like instrument comprising a control arrangement for automatically increasing the output of multiplier photocell from a low basic level to a desired level in response to an initiating switch operation and for reducing the output at the conclusion of a transmission or like operation to the basic low level in response to a further switch operation.

The desired level of sensitivity of the photocell is that which gives a standard output voltage in response to light reflected from a reference portion of the copy to be transmitted, or from an artificial copy, or alternatively in response to a source of light which has known intensity.

The method employed is thus that of a control system in which unidirectional control is used, operating in such a manner that the output of a photocell is increased from a low basic level to the level desired. At this desired level, which is predetermined, the control is removed and the cell is operated at that setting of output voltage for the duration of a message transmission. At the end of the message the output of the cell is returned to the basic low level.

The arrangement will be further described with reference to an embodiment shown in the accompanying drawing. Various portions of the apparatus are shown in block form since these individual parts are known to those skilled in the art, the invention consisting in the particular arrangement and connection of these parts in order to produce the desired results.

The "control" in the system is provided by the standard voltage level 1 which is derived for example in a particular system from a gas-filled reference tube. While the circuit is idle, i. e. when the transmitter is not in use, the control units 2, 3, which may consist of any suitable known voltage control device such as variable resistance, acting respectively on the lamp supply unit 4 and the photocell high voltage supply unit 5 hold these two supplies at a low level. Units 4 and 5 are normal mains-operated, power-supply units suitable for their respective purposes. On receipt of a starting signal (usually manually initiated) the motor supply unit 6 which may comprise a transformer or electronic audio-frequency voltage generator is connected via the "start" switch 7 to the motor drive unit 8 which latter is henceforth under the control of the on/off error signal. Motor drive unit 8 may consist of a 2-phase induction motor with suitable gearing. The error signal is sent from the comparator unit 9 and continues to be sent, in the "on" sense, to the motor supply unit 6 until such time as the motor drive unit 8, which is mechanically coupled to the control units, has increased the light and power inputs to the photocell 10 in step to the point at which the latter's output voltage over lead **10*a* in response to the light reflected from the lamp 13 by the reference copy 11 is approximately, say within 1%, equal to the standard voltage level 1. When this level is reached, the motor supply is disconnected from the motor drive by transmission of the "off" signal from the comparator unit, reducing the output of the motor supply unit 6, to zero or substantially to zero. The motor then stops and the photocell output remains at this level until the transmission has been completed. Comparator unit 9** may comprise any suitable known device for comparing two voltages and producing a signal proportional to the voltage difference. Such devices include a relay which moves in one direction when there is a difference between the voltages and moves in the other direction when the voltages balance.

At the end of the transmission of the message, the comparator unit 9 and the motor supply unit 6 are automatically disconnected and the "start" switch 7 is opened. Next, by an automatic or manual operation, the re-set switch 12 is made which connects the motor supply unit 6 to the motor drive unit 8, but with reversed connections. The motor therefore runs in the opposite direction until it reaches the original idling position at which point it automatically is then in a condition for re-commencing the sequence of operations for the next transmission.

Various modifications may be made within the scope of the invention.

Thus, it is not essential that the control units 2 and 3 should be operated in step.

The control units would be operated in sequence if, for example, full control could be effected under normal working conditions by control unit 2; but under abnormal working conditions when this control is insufficient, control unit 3 would be required to operate additionally and sequentially.

We claim:

1. In facsimile scanners and like instruments an arrangement whereby the output of a photoelectric cell in response to light reflected thereon from an electric lamp by a reference portion of the subject to be scanned is automatically increased from a basic low level to a preferred value at the commencement of a transmission or like operation and is restored to the basic low level at the end of the transmission or like operation, comprising means activated at the start of the transmission or like operation for increasing the photocell electrode voltage and lamp current automatically unitl the photoelectric cell output reaches the desired value and means actuated at the end of the transmission or like operation for automatically reversing the operation of said first means until the photocell output is restored to the basic low level.

2. In facsimile scanners and like instruments an arrangement whereby the output of a photoelectric cell in response to light reflected thereon from an electric lamp by a reference portion of the subject to be scanned is automatically increased from a basic low level to a preferred value at the commencement of a transmission or like operation and is restored to the basic low level at the end of the transmission or like operation, comprising a lamp supply unit, a photocell high voltage supply unit, units for controlling the lamp supply unit and the photocell high voltage supply unit, a standard voltage source, a unit for comparing the photoelectric cell output and the output from the standard voltage source, an electric motor adapted, on receipt of a start signal, to be actuated from the comparator unit when said outputs are unequal and to be disconnected when said outputs are equal within predetermined limits, and mechanically coupled to said control units and means for re-connecting the motor to the comparator unit with reversed connections to cause the motor to be restored to its original position.

3. An arrangement as claimed in claim 2, in which said motor comprises a motor supply unit and a motor drive unit adapted to be connected with forward and reverse connections.

References Cited in the file of this patent

UNITED STATES PATENTS

| | | |
|---|---|---|
| 1,813,204 | Schoenberg | July 7, 1931 |
| 2,176,442 | Wise | Oct. 17, 1939 |
| 2,570,665 | Gunderson | Oct. 9, 1951 |